(12) United States Patent
Laverty et al.

(10) Patent No.: US 11,644,109 B2
(45) Date of Patent: May 9, 2023

(54) FLOATING VALVE SEAT FOR A ROTARY CONTROL VALVE FOR USE IN SEVERE SERVICE APPLICATIONS

(71) Applicant: FISHER CONTROLS INTERNATIONAL LLC, Marshalltown, IA (US)

(72) Inventors: Larry T. Laverty, Marshalltown, IA (US); Kyle D. Pederson, Grimes, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/581,693

(22) Filed: Jan. 21, 2022

(65) Prior Publication Data

US 2022/0145999 A1 May 12, 2022

Related U.S. Application Data (63) Continuation of application No. 16/836,532, filed on Mar. 31, 2020, now Pat. No. 11,242,933.

(Continued)

(51) Int. Cl.
  *F16K 5/20* (2006.01)
  *F16K 5/06* (2006.01)
(52) U.S. Cl.
  CPC ............ *F16K 5/201* (2013.01); *F16K 5/0673* (2013.01); *F16K 5/0689* (2013.01)
(58) Field of Classification Search
  CPC ...... F16K 5/0689; F16K 5/201; F16K 5/0678; F16K 5/0673; F16K 5/0663; F16K 5/0642
  See application file for complete search history.

(56) References Cited

U.S. PATENT DOCUMENTS 2,349,170 A * 5/1944 Jackman ................. F16J 15/32
                                                   277/584
3,188,099 A * 6/1965 Johnson ................ F16J 15/166
                                                   277/584

(Continued)

FOREIGN PATENT DOCUMENTS

CN      202349250 U    7/2012
CN      202719181 U    2/2013
(Continued)

OTHER PUBLICATIONS

International Search Report received for PCT/US2020/035662, dated Aug. 26, 2020.

(Continued)

*Primary Examiner* — David Colon-Morales
(74) *Attorney, Agent, or Firm* — Marshall, Gerstein & Borun LLP (57) ABSTRACT

A valve seat is provided for use in a rotary valve for use in highly corrosive and abrasive applications. The valve seat includes a seat body adapted to selectively engage a portion of the floating ball element. The valve seat also includes a sealing element disposed in a first groove formed in the seat body and adapted to prevent fluid flow between the seat body and the valve body. The valve seat further includes a first bearing disposed in a second groove formed in the seat body, and a second bearing disposed in a third groove formed in the seat body, wherein the second and third grooves are formed immediately adjacent the first groove such that the first and second bearings are disposed immediately adjacent the sealing element.

20 Claims, 3 Drawing Sheets

Related U.S. Application Data (60) Provisional application No. 62/861,173, filed on Jun. 13, 2019.

(56) References Cited

U.S. PATENT DOCUMENTS

| | | | | |
|---|---|---|---|---|
| 3,473,814 | A | * | 10/1969 | Bastow .................. F16J 15/166 277/584 |
| 3,521,855 | A | | 7/1970 | Jensen |
| 3,533,597 | A | * | 10/1970 | Bolling ............... F16K 11/0873 251/174 |
| 3,582,093 | A | * | 6/1971 | Lucien .................. F16J 15/166 277/584 |
| 3,582,094 | A | * | 6/1971 | Whittaker ................ F16J 15/56 277/584 |
| 3,606,348 | A | * | 9/1971 | Taylor .................... F16J 15/008 277/933 |
| 3,614,114 | A | * | 10/1971 | Traub .................. F16J 15/3208 277/589 |
| 3,771,801 | A | * | 11/1973 | Burke ...................... F16J 15/32 277/944 |
| 4,052,112 | A | | 10/1977 | Faber |
| 4,059,280 | A | * | 11/1977 | Eastwood .............. F16J 15/166 277/575 |
| 4,114,639 | A | | 9/1978 | Cross et al. |
| 5,328,177 | A | * | 7/1994 | Lair ..................... F16J 15/3208 277/584 |
| 5,524,905 | A | * | 6/1996 | Thoman ................. F16J 15/166 277/572 |
| 5,879,010 | A | * | 3/1999 | Nilkanth ............. E21B 33/1216 277/584 |
| 6,065,736 | A | | 5/2000 | Hunt |
| 7,559,531 | B2 | | 7/2009 | Thomas et al. |
| 8,739,684 | B2 | * | 6/2014 | Okuma ................ F16J 15/3284 92/244 |
| 9,388,902 | B2 | * | 7/2016 | Sueyoshi ............... F16J 15/166 |
| 10,823,297 | B2 | * | 11/2020 | Artru .................... F16K 5/0673 |
| 2012/0211690 | A1 | | 8/2012 | Anderson et al. |
| 2015/0300509 | A1 | * | 10/2015 | He .......................... F16K 5/201 251/174 |
| 2016/0146357 | A1 | | 5/2016 | Hiss et al. |
| 2017/0307087 | A1 | | 10/2017 | Helfer et al. |
| 2019/0107211 | A1 | | 4/2019 | Lo Cicero |

FOREIGN PATENT DOCUMENTS

| | | | |
|---|---|---|---|
| CN | 106523731 A | | 3/2017 |
| DE | 4143306 A1 | * | 10/1992 |
| EP | 3417194 A1 | | 12/2018 |
| JP | S60198315 A | | 10/1985 |
| WO | WO-2013066187 A1 | | 5/2013 |
| WO | WO-2015119334 A1 | | 8/2015 |

OTHER PUBLICATIONS

Written Opinion received for PCT/US2020/035662, dated Aug. 26, 2020.

"Eclipse"—"3 Common Types of Backup Rings and Their Uses" by Eclipse Engineering Inc., publically available since Jul. 27, 2018, p. 1-8 (see at least 1-3) (2018).

* cited by examiner

FLOATING VALVE SEAT FOR A ROTARY CONTROL VALVE FOR USE IN SEVERE SERVICE APPLICATIONS

FIELD OF THE DISCLOSURE

The disclosure generally relates to rotary control valves and more specifically to a floating valve seat for a rotary control valve for use in severe service applications.

BACKGROUND OF THE DISCLOSURE

Process control systems often employ rotary valves, such as ball valves, butterfly valves, eccentric-disk valves, eccentric-plug valves, etc., to control the flow of process fluids. Rotary valves typically include a valve trim assembly having a seat disposed in the fluid path and surrounding a flow aperture, and a fluid control element (e.g., a disk, a ball, etc.) disposed in the fluid path and rotatably coupled to the body of the valve via a shaft. To control the flow of fluid through some rotary valves, the position of the fluid control element may be varied from a closed position at which the fluid control element is in sealing engagement with the seat, thereby preventing fluid flow through the flow aperture, to a fully open or maximum flow rate position at which the fluid control element is spaced away from the seat, thereby allowing fluid flow through the flow aperture.

In some cases, a rotary valve may be employed in severe service applications such as highly corrosive and abrasive applications. When a rotary valve is employed in severe service applications, the components of the rotary valve, e.g., the fluid control element and the seat, may be made of high-strength and corrosion-resistant metal. Although this extends the lifespan of the various components, frequent maintenance is still required. As an example, a valve seat may need to be replaced every 3 to 6 months, while the rotary valve itself may need to be replaced after 1 to 2 years in service.

Given the expense involved in performing frequent maintenance, various attempts have been made to provide a rotary valve that is easy (or at least easier) to maintain. One such known rotary valve includes a valve seat that moves within a valve body. Such a valve seat can be quickly and easily removed and replaced. However, because contact or adhesion between surfaces, which happens when the valve seat contacts or rubs against various surfaces of the valve body, tends to lead to galling, or wear, in the rotary valve, this known rotary valve creates an additional set of maintenance challenges.

SUMMARY

In accordance with a first exemplary aspect, a valve seat is provided for use in a rotary valve including a valve body and a floating ball element disposed in the valve body. The valve seat includes a seat body, a sealing element, a first bearing, and a second bearing. The seat body is adapted to selectively engage a portion of the floating ball element. The sealing element is disposed in a first groove formed in the seat body and is adapted to prevent fluid flow between the seat body and the valve body. The first bearing is disposed in a second groove formed in the seat body. The second bearing is disposed in a third groove formed in the seat body. The second and third grooves are formed immediately adjacent the first groove such that the first and second bearings are disposed immediately adjacent the sealing element to protect the sealing element.

In accordance with a second exemplary aspect, a trim assembly is provided for use in a rotary valve including a valve body. The trim assembly includes a valve stem, a floating ball element adapted to be disposed in the valve body and coupled to the valve stem, the floating ball element movable between an open position and a closed position, and a valve seat. The valve seat includes a seat body, a sealing element, a first bearing, and a second bearing. The seat body is adapted to selectively engage a portion of the floating ball element. The sealing element is disposed in a first groove formed in the seat body and is adapted to prevent fluid flow between the seat body and the valve body. The first bearing is disposed in a second groove formed in the seat body. The second bearing is disposed in a third groove formed in the seat body. The second and third grooves are formed immediately adjacent the first groove such that the first and second bearings are disposed immediately adjacent the sealing element to protect the sealing element.

In accordance with a third exemplary aspect, a rotary valve includes a valve body and an adapter coupled to one end of the valve body, thereby defining an inlet, an outlet, and a valve interior in fluid communication with the inlet and the outlet. The rotary valve also includes a floating ball element pivotably mounted in the valve interior via a valve stem to control fluid flow through the valve, the floating ball element movable between an open position, allowing fluid to flow between the valve inlet and the valve outlet, and a closed position, preventing fluid from flowing between the valve inlet and the valve outlet. The rotary valve also includes a first valve seat movably disposed in the valve interior proximate to the valve outlet. The first valve seat includes a seat body, a sealing element, a first bearing, and a second bearing. The seat body is configured to engage a first portion of the floating ball element when the floating ball element is in the closed position. The sealing element is disposed in a first groove formed in the seat body and is configured to prevent fluid flow between the seat body and the valve body. The first bearing is disposed in a second groove formed in the seat body. The second bearing is disposed in a third groove formed in the seat body. The second and third grooves are formed immediately adjacent the first groove such that the first and second bearings are disposed immediately adjacent the sealing element to protect the sealing element.

In further accordance with any one or more of the foregoing first, second, or third exemplary aspects, a valve seat, a trim assembly, or a rotary valve may include any one or more of the following further preferred forms.

In one preferred form, the first groove is formed between the second and third grooves, such that the sealing element is disposed between the first and second bearings.

In another preferred form, the seat body includes an outer perimeter surface and an inner perimeter surface opposite the outer perimeter surface, and wherein the first, second, and third grooves are formed in the outer perimeter surface. A biasing element may be disposed in the first groove and configured to bias the sealing element away from the inner perimeter surface.

In another preferred form, the sealing element includes an elastomeric seal.

In another preferred form, the first and second bearings each include a split-ring.

In another preferred form, a biasing element is disposed in the first groove and configured to bias the sealing element radially outward.

In another preferred form, a second valve seat is movably disposed in the valve interior proximate to the valve inlet and configured to sealingly engage a second portion of the floating ball element when the floating ball element is in the closed position. A biasing element may be configured to bias the second valve seat toward the floating ball element, the biasing element arranged between the valve inlet and the second valve seat.

In another preferred form, the sealing element includes a bi-directional sealing element configured to effectuate a bi-dimensional seal between the seat body and the valve body.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to a valve seat for use in a rotary control valve for use in severe service applications. The valve seat is configured to move (e.g., float) within a valve body of the rotary control valve such that the valve seat sealingly engages a floating ball element of the rotary control valve when the floating ball element is in a closed position, thereby achieving the necessary shutoff. The valve seat also includes one or more sealing elements configured to effect a seal between the valve body and the valve seat. At the same time, the valve seat includes one or more bearing elements that allow the seat to move as necessary but provide the correct clearance for the one or more sealing elements and protect the seal from abrasive or corrosive material that may be present in fluid flowing in these severe service applications.

Figure 1:
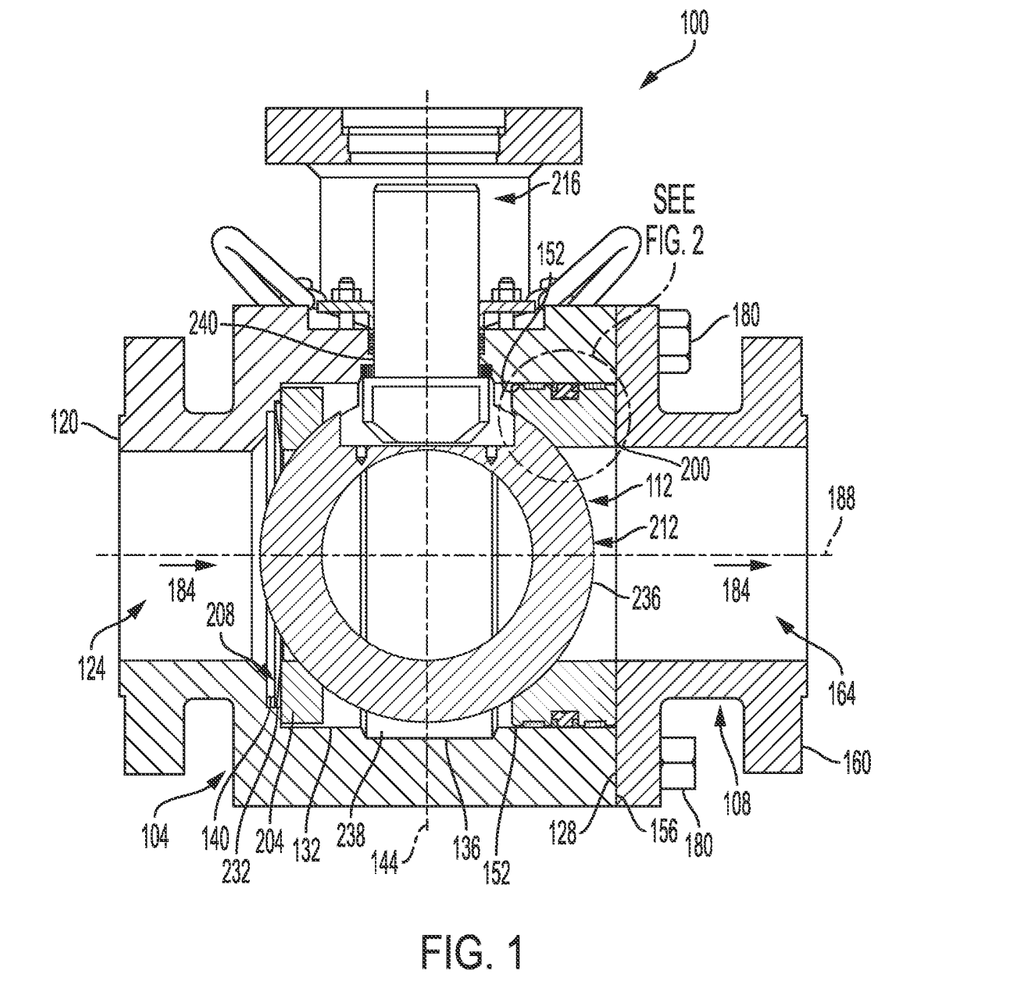
FIG. 1 is a cross-sectional view of a first example of a rotary control valve constructed in accordance with the teachings of the present invention.
Figure 2:
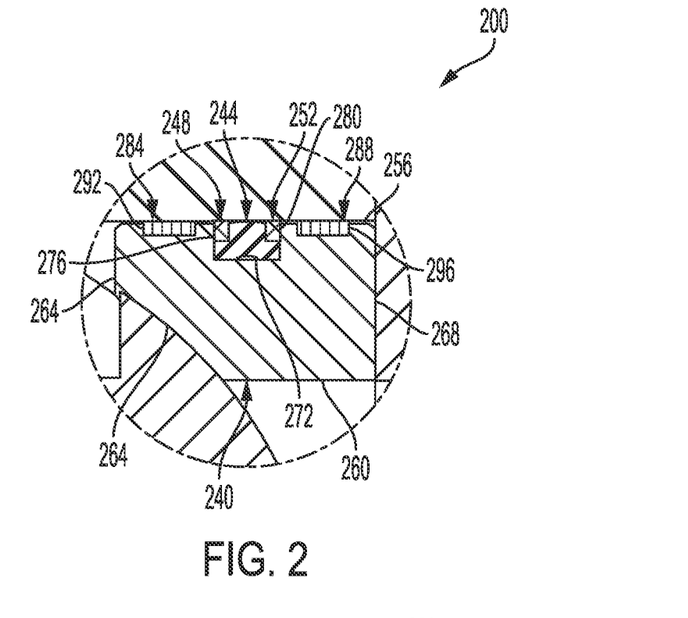
FIG. 2 is an enlarged, partial cross-sectional view of a valve seat employed in the rotary control valve of FIG. 1.

FIGS. 1 and 2 illustrate one example of a rotary control valve 100 constructed in accordance with the principles of the present invention. The rotary control valve 100 is made or manufactured from or using one or more suitable high-strength and corrosion-resistant materials, such that the rotary control valve 100 is specifically configured for use in highly corrosive and abrasive applications. Of course, if desired, the rotary control valve 100 can be made from or using different materials and/or can be utilized in other applications (e.g., less corrosive and abrasive applications).

With reference to FIG. 1, the rotary control valve 100 generally includes a valve body 104, an end adapter 108 removably coupled to one end of the valve body 104, and a valve trim assembly 112 coupled to the valve body 104 and the end adapter 108. The valve body 104 is generally cylindrical and has a first end 120 that defines a fluid inlet 124 of the valve 100, a second end 128 disposed opposite the first end 120, and an interior or opening 132 arranged between the fluid inlet 124 and the second end 128. The interior or opening 132 is sized to receive components of the valve trim assembly 112, as will be described in greater detail below. The valve body 104 also includes a pair of counter bores—a first counter bore 136 and a second counter bore 140. The first counter bore 136 is centrally formed about a longitudinal axis 144 of the valve 100 and serves to create a space within the valve 100 that can accommodate a limited amount of particle build up without affecting operation of the valve 100. The second counter bore 140 is also arranged within the interior 132 of the valve body 104, but at a position more proximate to the first end 120 (and a position proximate to the fluid inlet 124). The valve body 104 also includes an inner radial surface 152 that extends between the second counter bore 140 and the second end 128 within the interior 132. Further details regarding the first counter bore 136 and the second counter bore 140 will be described below. The end adapter 108 is also generally cylindrical and has a first end 156 and a second end 160 that is disposed opposite the first end 156 and defines a fluid outlet 164 of the valve 100.

The end adapter 108 is, as illustrated in FIG. 1, removably coupled to the valve body 104 by removably coupling the first end 156 of the end adapter 108 to the second end 128 of the valve body 104 in any suitable manner, e.g., via a plurality of fasteners 180. When the valve body 104 and the end adapter 108 are so coupled, the valve 100 defines a fluid flow passageway 184 between the fluid inlet 124 (defined by the valve body 104) and the fluid outlet 164 (defined by the end adapter 108). The fluid flow passageway 184 is oriented along an axis 188 that is substantially perpendicular to the longitudinal axis 144.

With reference to FIGS. 1 and 2, the trim assembly 112 includes a first valve seat 200, a second valve seat 204, a biasing element 208, a closure member 212, and a stem or shaft 216. The first valve seat 200 is movably disposed (e.g., floats) in the fluid flow passageway 184 proximate the fluid outlet 164, and, more particularly, against the first end 156 of the end adapter 108. The second valve seat 204 is, like the first valve seat 200, movably disposed (e.g., floats) in the fluid flow passageway 184, but is disposed upstream of the first valve seat 200 at a position proximate the fluid inlet 124, and, more particularly, immediately adjacent the second counter bore 140. It will be appreciated that the first and second valve seats 200, 204 are removably retained within the fluid flow passageway 184 by virtue of the other components of the rotary valve 100 (e.g., the valve body 104, the end adapter 108). In other words, the first and second valve seats 200, 204 are removably retained within the fluid flow passageway 184 without using any fasteners. As a result, the first and second valve seats 200, 204 can be easily and quickly removed and replaced by decoupling the end adapter 108 from the valve body 104.

As illustrated in FIG. 1, the biasing element 208, which in this example takes the form of a Belleville spring, is arranged in an opening 232 between the second counter bore 140 and the second valve seat 204. So arranged, the biasing element 208 biases the second valve seat 204 toward and into engagement with the closure member 212. The closure member 212 is disposed within the fluid flow passageway 184 and is illustrated as a floating ball element having a peripheral edge 236 that sealingly engages both the first valve seat 200 and the second valve seat 204 to prevent the flow of fluid (e.g., slurry) through the valve 100. As illustrated in FIG. 1, the first counter bore 136 is formed so as to create a space 238 between the peripheral edge 236 of the closure member 212 and the inner radial surface 152 of the valve body 104. Thus, when the valve 100 is in operation, the valve 100 can, via the space 238, accommodate or tolerate a limited amount of particle build up (i.e., particles can be packed in) without affecting the operation of the valve 100.

The stem or shaft 216 is disposed in an opening 240 of the valve body 104 and partially disposed in the interior 132 along the longitudinal axis 144. The stem or shaft 216 is coupled to one end of the closure member 212, which can be accomplished in any known manner. When the closure member 212 is coupled to the shaft 216, the shaft 216 can move (e.g., rotate) the closure member 212 between a closed position, shown in FIG. 1, in which the peripheral edge 236 of the closure member 212 sealingly engages both the first valve seat 200 and the second valve seat 204 to close the valve 100 (and prevent fluid flow therethrough), and an open position, not shown, in which the peripheral edge 236 of the closure member 212 is spaced from the first valve seat 200 and the second valve seat 204 to permit fluid flow through the valve 100 (particularly the fluid flow passageway 184).

As best illustrated in FIG. 2, the first valve seat 200 in this example includes a seat body 240 as well as a sealing element 244, a first bearing 248, and a second bearing 252, each of which is integrated into the seat body 240. The seat body 240 in this example has a substantially annular shape defined by an outer perimeter surface 256, an inner perimeter surface 260 opposite the outer perimeter surface 256, an inner side 264 extending between the inner and outer perimeter surfaces 260, 256, and an outer side 268 opposite the inner side 264. The outer perimeter surface 256 of the seat body 240 is immediately adjacent, but spaced from, the inner radial surface 152 of the valve body 104. Meanwhile, the inner side 264 of the seat body 240 sealingly engages a portion of the peripheral edge 236 of the closure member 212 when the closure member 212 is in the closed position, shown in FIG. 1, in order to prevent fluid flow between the closure member 212 and the fluid outlet 164. Conversely, when the closure member 212 is in the open position, the inner side 264 of the seat body 240 is spaced from the peripheral edge 236 of the closure member 212, thereby allowing fluid flow between the closure member 212 and the fluid outlet 164 (and, more generally, through the fluid passageway 184). The outer side 268 of the seat body 240 is immediately adjacent the first end 156 of the end adapter 108. It will be appreciated that as the closure member 212 moves between its closed and open positions, the first valve seat 200 moves (e.g., floats) in an axial direction such that the outer side 268 of the seat body 240 moves into and out of engagement, respectively, with the first end 156 of the end adapter 108. Thus, when the closure member 212 is in its closed position, the outer side 268 of the seat body 240 engages the first end 156 of the end adapter 108, as illustrated in FIG. 1.

The sealing element 244 is made of or from a material, such as Teflon, graphite, or various plastics, suitable for withstanding corrosive and abrasive fluid (e.g., sand slurry) flowing through the rotary valve 100. The sealing element 244 in this example takes the form of O-ring or other elastomeric seal that is installed (e.g., stretched) over the outer perimeter surface 256 of the seat body 240 and disposed in a first groove 272 formed in the seat body 240, and, more particularly, the outer perimeter surface 256 of the seat body 240. The first groove 272 is formed in the seat body 240 and the sealing element 244 is sized such that a portion of the sealing element 244 is positioned radially outwardly of the outer perimeter surface 256, such that the sealing element 244 is arranged to sealingly engage the inner radial surface 152, at a position proximate the end surface 156 of the end adapter 108, to effectuate a bi-directional seal between the valve body 104 and the first valve seat 200. At the same time, the sealing element 244 allows the first valve seat 200 to move relative to the valve body 104.

The first and second bearings 248, 252 are also made of or from a material, such as Teflon, graphite, or various plastics, suitable for withstanding corrosive and abrasive fluid (e.g., sand slurry) flowing through the rotary valve 100. The first and second bearings 248, 252 generally act as a guide for the first valve seat 200, allowing the first valve seat 200 to move in an axial direction along the fluid flow passageway 184, as needed, but still maintaining alignment between the first valve seat 200 and the closure element 212 so that the sealing element 244 is in the proper position for sealing purposes. The first bearing 248 in this example takes the form of an anti-extrusion split-ring that is installed over the outer perimeter surface 256 of the seat body 240 and is disposed in a second groove 276 formed in the seat body 240, and, more particularly, the outer perimeter surface 256 of the seat body 240. The second bearing 252 in this example takes the form of an anti-extrusion split ring that is installed over the outer perimeter surface 256 of the seat body 240 and is disposed in a third groove 280 formed in the seat body 240, and, more particularly, the outer perimeter surface 256 of the seat body 240. Like the sealing element 244, each of the first and second bearings 248, 252 has a portion that is positioned radially outwardly of the outer perimeter surface 256, such that the first and second bearings 248, 252 also engage the inner radial surface 152. This allows the first valve seat 200 to move in the axial direction but, by engaging the inner radial surface 152 in this manner, prevents the first valve seat 200 from moving in a radial direction (i.e., away from the inner radial surface 152), which would lead to misalignment of the first valve seat 200 and the closure element 212.

With reference still to FIG. 2, in this example, the first groove 272 is centrally located between the inner side 264 and the outer side 268 of the seat body 240, such that the sealing element 244 is centrally located between the inner side 264 and the outer side 268 of the seat body 240. The second groove 276 in this example is formed between the inner side 264 and a central portion of the first groove 272, such that the first bearing 248 disposed therein is substantially located between the inner side 264 of the seat body 240 and the sealing element 244. The third groove 280 in this example is formed between the central portion of the first groove 272 and the outer side 268 of the seat body 240, such that the second bearing 252 disposed therein is substantially located between the sealing element 244 and the outer side 268 of the seat body 240. As such, the sealing element 244 is located immediately adjacent the first and second bearings 248, 252. More particularly, the sealing element 244 is effectively located between the first and second bearings 248, 252 along the outer perimeter surface 256 of the seat body 240. In turn, and because the first and second bearings 248, 252 also extend radially outwardly of the outer perimeter surface 256 and engage the inner radial surface 152, the first and second bearings 248, 252 act as a scraper that protects the sealing element 244 from abrasive or corrosive material that may be present in the fluid flowing through the fluid passageway 184.

As best illustrated in FIG. 2, the first valve seat 200 can also include a first bushing 284 and a second bushing 288 each also integrated into the seat body 240. The first bushing 284 in this example takes the form of an annular bushing that is installed over the outer perimeter surface 256 of the seat body 240 and is disposed in a fourth groove 292 formed in the seat body 240, and, more particularly, the outer perimeter surface 256 of the seat body 240. The fourth groove 292 is located between the inner side 264 of the seat body 240 and the second groove 276, such that the first bushing 284 is located between the inner side 264 of the seat body 240 and the first bearing 248 (as well as the sealing element 244 and the second bearing 252). The second bushing 288 is, at least in this example, identical to the first bushing 284 but is disposed in a fifth groove 296 formed in the seat body 240, and, more particularly, the outer perimeter surface 256 of the seat body 240. The fifth groove 296 is located between the outer side 268 of the seat body 240 and the third groove 280, such that the second bushing 288 is located between the outer side 268 of the seat body 240 and the second bearing 252 (as well as the sealing element 244 and the first bearing 248).

While not described or illustrated herein, it will be appreciated that the valve 100 can include additional components. An actuator, such as a mechanical actuator (e.g., a handle), a pneumatic actuator, a hydraulic actuator, an electric actuator, or any other suitable actuator, can be operatively coupled to the shaft 216 to drive (e.g., rotate) the closure member 212 between the closed position and the open position to control the flow of fluid through the valve 100. The valve 100 can also include a packing set that is disposed in the opening 240 of the valve body 104 to prevent fluid leakage. The packing set can be retained in the desired position with a packing gland, packing stud, one or more washers (e.g., Belleville washers), other components, or combinations thereof, and, as is known in the art, such components can be adjusted to alter the force imparted on the packing set, thereby altering the seal between the packing set and the shaft 216. The valve 100 can also include other components, e.g., a thrust bushing and a bracket (e.g., for coupling the packing set and other components to the valve body 104).

In operation, the actuator (not shown) drives the closure member 212 between the open position (not shown) and the closed position illustrated in FIG. 1. In the open position, which is not shown, fluid can flow through the fluid flow passageway 184 of the valve 100. The first counter bore 136 is positioned to help facilitate fluid flow by flushing out any particles (e.g., minerals) that would otherwise become lodged or collected between the valve body 104 and the biasing element 208. Additionally, and as discussed above, the sealing element 244 is protected from process fluid flowing through the fluid passageway 184 by the first and second bearings 248, 252. Meanwhile, in the closed position, the closure member 212 engages the first valve seat 200 and the second valve seat 204 (which is biased toward and into engagement with the closure member 212 via the biasing element 208) to effect a seal and provide a shutoff (i.e., prevent the flow of fluid through the fluid flow passageway 184).

It will be appreciated that the rotary valve 100 can vary from the rotary valve 100 illustrated in FIG. 1. The shape, size, and/or construction of the valve body 104 and/or the end adapter 108 can vary. As an example, the valve body 104 need not include the first and/or second counter bores 136, 140. The shape, size, and/or construction of any components of the trim assembly 112 can vary. In some examples, the shape, size, and/or construction of the first valve seat 200 can vary. In some examples, the shape, size, and/or construction of the second valve seat 204 can vary. In some examples, the shape and/or size of the closure member 212 can vary as well. As an example, while the closure member 212 is illustrated as being a ball, the closure member 212 can, in other implementations, be a disk or any other suitable closure member.

Figure 3:
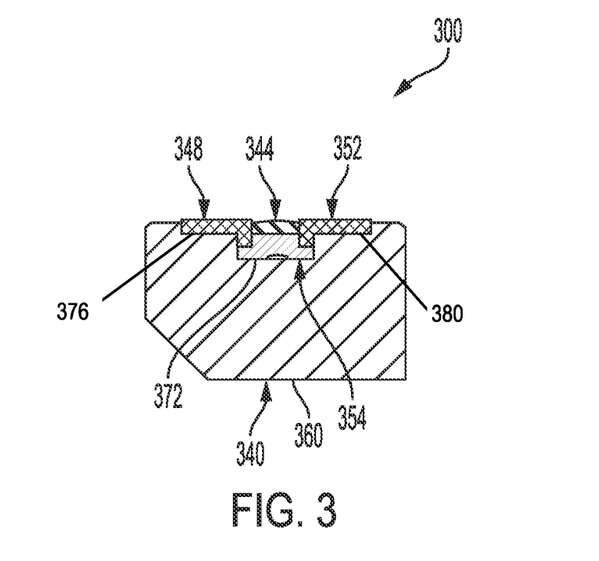
FIG. 3 is an enlarged, partial cross-sectional view similar to FIG. 2, but showing another example of a valve seat that is constructed in accordance with the teachings of the present invention and can be employed in the rotary control valve of FIG. 1.

FIG. 3, for example, illustrates another example of a valve seat 300 that can be used in place of the first valve seat 200. The valve seat 300 is similar to the valve seat 200 in that it includes a seat body 340, a sealing element 344, a first bearing 348, and a second bearing 352, each of which is integrated into the seat body 340, but is different in several ways.

First, the sealing element 344 is smaller in cross-section than the sealing element 244 of the first valve seat 200. This is because the valve seat 300 also includes a biasing element 354 that is integrated into the seat body 340 and coupled to (e.g., integrally formed with) the sealing element 344. The biasing element 354 in this example takes the form of an energizing ring that is disposed in a first groove 372 that is formed in the seat body 340 and is larger than the first groove 272, and which also receives the sealing element 344. More particularly, the biasing element 354 is disposed in the first groove 372 between an inner perimeter surface 360 of the seat body 340 and the sealing element 344, such that the biasing element 354 engages the sealing element 344 and biases the sealing element 344 outward, away from the inner perimeter surface 360, and toward and into sealing engagement with the inner radial surface 152.

Second, the first and second bearings 348, 352 are functionally similar to but structurally different than the first and second bearings 248, 252, respectively. Unlike the first and second bearings 248, 252, which each have a rectangular shape in cross-section, the first and second bearings 348, 352 each have an L-shape in cross-section. As illustrated in FIG. 3, a first portion of each of the first and second bearings 348, 352 engages both the sealing element 344 and the biasing element 354, thereby retaining the sealing element 344 and the biasing element 354 in the first groove 372, while a second portion of each of the first and second bearings 348, 352 extends outward, away from the first groove 372. Moreover, because the first and second bearings 348, 352 are structurally different than the first and second bearings 248, 252, it will be appreciated that the first bearing 348 is disposed in a second groove 376 that is formed in the seat body 340 and has a different shape than the second groove 276 (the shape of the second groove 376 matches the shape of the first bearing 348), and the second bearing 352 is disposed in a third groove 380 that is also formed in the seat body 340 and has a different shape than the third groove 380 (the shape of the third groove 380 matches the shape of the second bearing 352).

The first valve seat 200 can vary in other ways as well. In some examples, the first valve seat 200 can also include a relief passage formed between the sealing element 244 and each of the first and second bearings 248, 252, thereby allowing excess pressure to be directed out of and away from the first valve seat 200. In some examples, the sealing element 244, which in the example illustrated in FIGS. 1 and 2 is a bi-directional sealing element, can be replaced by a uni-directional sealing element or by a pair of uni-directional sealing elements. As an example, the sealing element 244 can be replaced by a pair of uni-directional sealing elements both disposed in the first groove 272, in which case the pair of uni-directional sealing elements would be effectively located between the first and second bearings 248, 252. In another example, the sealing element 244 can be replaced by a pair of uni-directional sealing elements and the components of the first valve seat 200 can be rearranged so that the first and second bearings 248, 252 are instead located between the uni-directional sealing elements. In such an arrangement, one of the uni-directional sealing elements will prevent fluid flow between the inner side 264 of the seat body 240 and the first bearing 248, whereas the other of the uni-directional sealing elements will prevent fluid flow between the outer side 268 of the seat body 240 and the second bearing 252.

Figure 4:
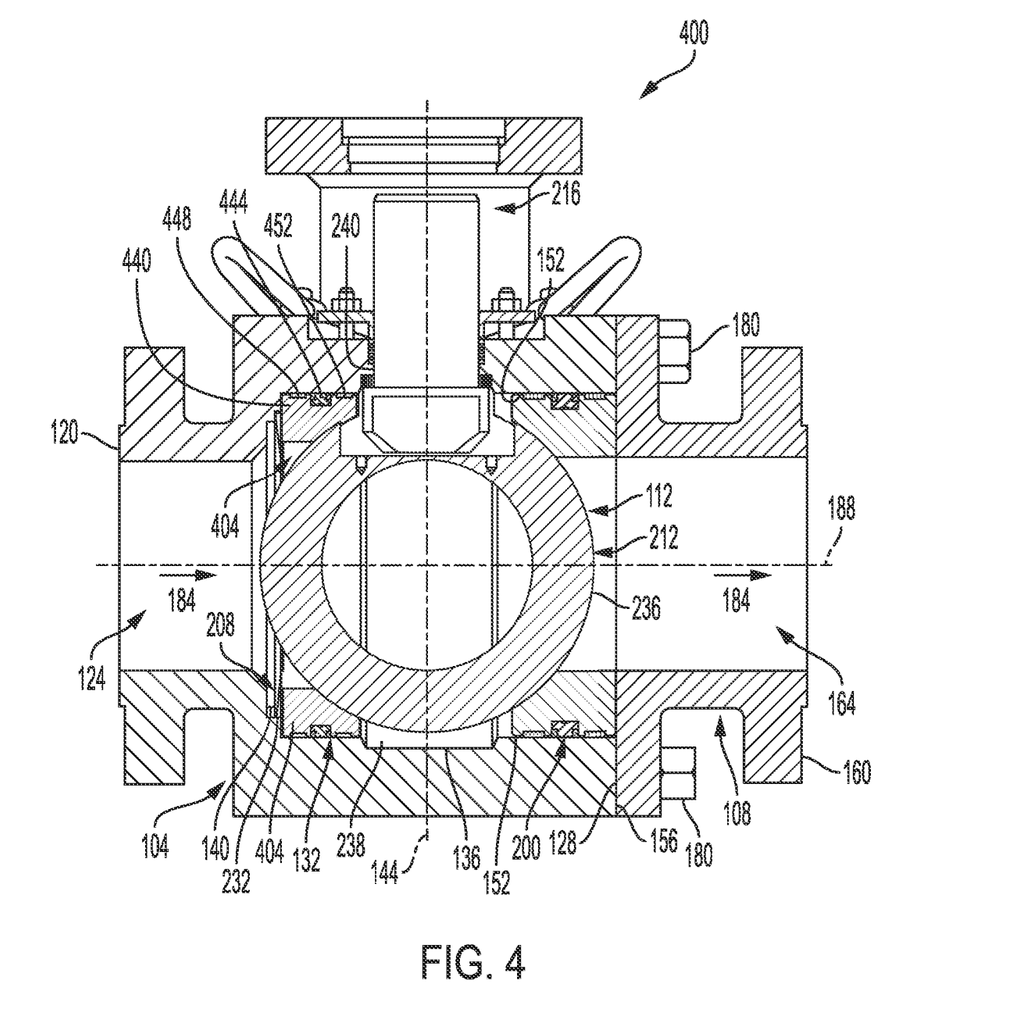
FIG. 4 is a cross-sectional view of a second example of a rotary valve constructed in accordance with the teachings of the present invention.

FIG. 4 illustrates another example of a rotary control valve 400 constructed in accordance with the principles of the present invention. The rotary control valve 400 is substantially similar to the rotary control valve 100, with common components depicted using common reference numerals. However, unlike the rotary control valve 100, wherein the first and second valve seats 200, 204 are different, the rotary control valve 400 has a second valve seat 404 that is identical to the first valve seat 200 (but for the fact that the second valve seat 404 is smaller than the first valve seat 200). Thus, in this example, the second valve seat 404 includes a seat body 440 as well as a sealing element 444, a first bearing 448, and a second bearing 452, each of which is integrated into the seat body 440. As the second valve seat 404 operates in a similar manner as the first valve seat 200, details regarding the functionality of the second valve seat 404 are omitted herein for the sake of brevity.

In other examples, the second valve seat 404 can vary from what is illustrated in FIG. 4. In some examples, the second valve seat 404 can only include the first and second bearings 448, 452 (i.e., does not include the sealing element 444). In some examples, the sealing element 444 can be replaced by a uni-directional sealing element or by a pair of uni-directional sealing elements. As an example, the sealing element 444 can be replaced by a pair of uni-directional sealing elements that are effectively located between the first and second bearings 448, 452 or are located outside of the first and second bearings 448, 452.

Further, it will be appreciated that the rotary valves described herein, as well as the components therein, can be manufactured with standard manufacturing techniques, such as, for example, drilling, machining, punching and casting. Alternatively, the rotary valves described herein, as well as the components therein, can be manufactured with an additive manufacturing technique. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

Finally, although certain rotary valves have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:

1. A valve seat for use in a rotary valve comprising a valve body and a floating ball element movably disposed in the valve body, the valve seat comprising:
 a seat body adapted to selectively engage a portion of the floating ball element;
 a sealing element disposed in a first groove formed in the seat body and adapted to prevent fluid flow between the seat body and the valve body;
 a first bearing disposed in a second groove formed in the seat body;
 a second bearing disposed in a third groove formed in the seat body, wherein the second and third grooves are formed immediately adjacent the first groove such that the first and second bearings are disposed immediately adjacent the sealing element to protect the sealing element;
 a first bushing disposed in a fourth groove formed in the seat body, wherein the first bushing is spaced apart from the first bearing; and
 a second bushing disposed in a fifth groove formed in the seat body, wherein the second bushing is spaced apart from the second bearing.

2. The valve seat of claim 1, wherein the first groove is formed between the second and third grooves, such that the sealing element is disposed between the first and second bearings.

3. The valve seat of claim 1, wherein each of the first bearing and the second bearing has a portion that is positioned radially outwardly of an outer perimeter surface of the seat body.

4. The valve seat of claim 1, wherein the fourth groove is formed between an inner side of the seat body and the second groove, such that the first bushing is disposed between the inner side of the seat body and the first bearing.

5. The valve seat of claim 1, wherein the fifth groove is formed between an outer side of the seat body and the second groove, such that the first bushing is disposed between the inner side of the seat body and the first bearing.

6. The valve seat of claim 1, wherein the seat body comprises an outer perimeter surface and an inner perimeter surface opposite the outer perimeter surface, wherein the fourth and fifth grooves are formed in the outer perimeter surface.

7. The valve seat of claim 6, wherein the sealing element comprises an annular seal installed over the outer perimeter surface of the seat body.

8. The valve seat of claim 1, wherein the first and second bearings each comprise a split-ring.

9. The valve seat of claim 1,
 wherein the first bushing is structurally separate from the first bearing; and
 wherein the second bushing is structurally separate from the second bearing.

10. The valve seat of claim 9, wherein the first groove is formed between the second and third grooves, such that the sealing element is disposed between the first and second bearings.

11. The valve seat of claim 9, wherein each of the first bearing and the second bearing has a portion that is positioned radially outwardly of an outer perimeter surface of the seat body.

12. The valve seat of claim 9, wherein the fourth groove is formed between an inner side of the seat body and the second groove, such that the first bushing is disposed between the inner side of the seat body and the first bearing, and wherein the fifth groove is formed between an outer side of the seat body and the second groove, such that the first bushing is disposed between the inner side of the seat body and the first bearing.

13. The valve seat of claim 9, wherein the seat body comprises an outer perimeter surface and an inner perimeter surface opposite the outer perimeter surface, wherein the fourth and fifth grooves are formed in the outer perimeter surface.

14. The valve seat of claim 13, wherein the sealing element comprises an annular seal installed over the outer perimeter surface of the seat body.

15. A trim assembly for use in a rotary valve comprising a valve body, the trim assembly comprising:
  a valve stem;
  a floating ball element adapted to be disposed in the valve body and coupled the valve stem, the floating ball element movable between an open position and a closed position; and
  a valve seat, the valve seat comprising:
    a seat body configured to engage a portion of the floating ball element when the floating ball element is in the closed position;
    a sealing element disposed in a first groove formed in the seat body and adapted to prevent fluid flow between the seat body and the valve body;
    a first bearing disposed in a second groove formed in the seat body;
    a second bearing disposed in a third groove formed in the seat body, wherein the second and third grooves are formed immediately adjacent the first groove such that the first and second bearings are disposed immediately adjacent the sealing element to protect the sealing element;
    a first bushing disposed in a fourth groove formed in the seat body, wherein the first bushing is spaced apart from the first bearing; and
    a second bushing disposed in a fifth groove formed in the seat body, wherein the second bushing is spaced apart from the second bearing.

16. A rotary valve, comprising:
  a valve body and an adapter coupled to one end of the valve body, thereby defining a valve inlet, a valve outlet, and a valve interior in fluid communication with the valve inlet and the valve outlet;
  a floating ball element pivotably mounted in the valve interior via a valve stem to control fluid flow between the valve inlet and the valve outlet, the floating ball element movable between an open position, allowing fluid to flow between the valve inlet and the valve outlet, and a closed position, preventing fluid from flowing between the valve inlet and the valve outlet; and
  a first valve seat movably disposed in the valve interior proximate to the valve outlet, wherein the first valve seat comprises:
    a seat body configured to engage a first portion of the floating ball element when the floating ball element is in the closed position;
    a sealing element disposed in a first groove formed in the seat body and configured to prevent fluid flow between the valve body and the seat body;
    a first bearing disposed in a second groove formed in the seat body;
    a second bearing disposed in a third groove formed in the seat body, wherein the second and third grooves are formed immediately adjacent the first groove such that the first and second bearings are disposed immediately adjacent the sealing element to protect the sealing element;
    a first bushing disposed in a fourth groove formed in the seat body, wherein the first bushing is spaced apart from the first bearing; and
    a second bushing disposed in a fifth groove formed in the seat body, wherein the second bushing is spaced apart from the second bearing.

17. The rotary valve of claim 16, wherein the seat body comprises an outer perimeter surface and an inner perimeter surface opposite the outer perimeter surface, wherein the fourth and fifth grooves are formed in the outer perimeter surface, and wherein the sealing element comprises an annular seal installed over the outer perimeter surface of the seat body.

18. The rotary valve of claim 16, further comprising a second valve seat movably disposed in the valve interior proximate to the valve inlet and configured to sealingly engage a second portion of the floating ball element when the floating ball element is in the closed position.

19. The valve seat of claim 16, wherein the fourth groove is formed between an inner side of the seat body and the second groove, such that the first bushing is disposed between the inner side of the seat body and the first bearing, and wherein the fifth groove is formed between an outer side of the seat body and the second groove, such that the first bushing is disposed between the inner side of the seat body and the first bearing.

20. The valve seat of claim 16, wherein each of the first bearing and the second bearing has a portion that is positioned radially outwardly of an outer perimeter surface of the seat body.

* * * * *

UNITED STATES PATENT AND TRADEMARK OFFICE
CERTIFICATE OF CORRECTION

| | | |
|---|---|---|
| PATENT NO. | : 11,644,109 B2 | |
| APPLICATION NO. | : 17/581693 | |
| DATED | : May 9, 2023 | |
| INVENTOR(S) | : Larry T. Laverty et al. | |

It is certified that error appears in the above-identified patent and that said Letters Patent is hereby corrected as shown below:

On the Title Page

At page 2, in Column 2, item (56), under "OTHER PUBLICATIONS", Line 4, "publically" should be -- publicly --.

In the Claims

At Column 11, Line 29, "coupled the" should be -- coupled to the --.

Signed and Sealed this
Ninth Day of April, 2024

Katherine Kelly Vidal
*Director of the United States Patent and Trademark Office*